United States Patent [19]

Helm et al.

[11] 4,266,911
[45] May 12, 1981

[54] WIND POWER PLANT AND METHOD OF ERECTING IT

[75] Inventors: Siegfried Helm, Petershausen; Peter Sprang, Munich, both of Fed. Rep. of Germany

[73] Assignee: Maschinenfabrik Augsburg-Nurnberg Aktiengesellschaft, Munich, Fed. Rep. of Germany

[21] Appl. No.: 36,272

[22] Filed: May 4, 1979

[30] Foreign Application Priority Data

May 30, 1978 [DE] Fed. Rep. of Germany ....... 2823525

[51] Int. Cl.³ ............................................. F03D 11/04
[52] U.S. Cl. ........................................ 416/9; 416/142; 416/500
[58] Field of Search ................... 416/9, 142 R, 142 B, 416/DIG. 6

[56] References Cited

U.S. PATENT DOCUMENTS

| 419,526 | 1/1890 | Keep | 416/9 X |
|---|---|---|---|
| 546,710 | 9/1895 | Rogers | 416/9 X |
| 756,216 | 4/1904 | Crunican | 416/9 |
| 2,784,556 | 3/1957 | Perdue | 416/DIG. 6 X |
| 4,003,676 | 1/1977 | Sweeney | 416/132 B |
| 4,083,651 | 4/1978 | Cheney et al. | 416/18 |
| 4,084,921 | 4/1978 | Norz | 416/114 X |
| 4,180,369 | 12/1979 | Ottosen | 416/9 X |
| 4,201,514 | 5/1980 | Huetter | 416/132 B X |

FOREIGN PATENT DOCUMENTS

| 830180 | 1/1952 | Fed. Rep. of Germany .... 416/DIG. 6 |
| 2735298 | 2/1979 | Fed. Rep. of Germany ............. 416/9 |
| 2346572 | 10/1977 | France ............................ 416/DIG. 4 |

OTHER PUBLICATIONS

Machine Design; vol. 48, No. 12; May 20, 1976; pp. 18-20, 23-26.

Primary Examiner—Everette A. Powell, Jr.
Attorney, Agent, or Firm—Alan H. Levine

[57] ABSTRACT

A wind power plant comprising a tower carrying a power system including a power house and vanes rotatable by the wind. The tower has a lower natural frequency of vibration between the lower and higher critical frequencies of vibration of the power system, and the tower has a higher natural frequency of vibration above the higher critical frequency of vibration of the power system. A ring surrounds and is disconnectably attached to the tower, and guy wires extend from the ring to the ground. The power system is assembled on the ground and so that it surrounds the tower, and the power system is then elevated, together with the ring, along the tower. Elevation may be accomplished with cables and a winch. Alternatively, a thread-like ledge may surround the tower and the power house may carry means for engaging and moving along the ledge to elevate and lower the power house.

11 Claims, 4 Drawing Figures

WIND POWER PLANT AND METHOD OF ERECTING IT

This invention relates to a wind power plant, consisting of a power house fitted with wind sails or vanes carried on a tower, and to a method of erecting such a wind power plant.

Among the methods for recovering energy carried by the atmosphere, that of converting wind power into electrical power is increasingly gaining importance. For this purpose, use is made of wind power plants consisting of a power house fitted with vanes mounted on a tower rising as high as 100 meters and more. The power house normally has an oblong shape, to suit the in-line coupling arrangement of electrical generating machines, and is placed on the upper end face of the tower.

In building practice, tower designs have been employed, such as television or water towers, in which the housing, e.g., a dwelling, a water reservoir, or the like, is attached to a static suitably-sized reinforced concrete tower.

In order to erect such towers, the housing is assembled and largely furnished or equipped on the ground surrounding the previously completed reinforced concrete tower. Using hoisting or jacking means, such as cables or hydraulic jacks and the like, the housing is then elevated to the intended level and there secured to the tower.

This method does not readily lend itself to use with wind power plants. One reason is that owing to extremely high loads experienced at higher wind velocities, towers measuring at least 6 meters in diameter would be required. However, no reasonably-sized power house of the foregoing description could be assembled around such large diameter towers.

Procedures have therefore been attempted wherein a working tower taller than the power plant tower is erected adjacent to the latter for hoisting and depositing on the power plant tower the power house previously assembled on the ground between towers. In this manner, it was attempted to replace a mobile crane, unable as it was to cope with such heights, with a type of stationary crane. This method, however, has proved very complex and uneconomical, and not suitable for the periodic elevating and lowering maneuvers required for the servicing of a wind power plant.

In a broad aspect the present invention provides a wind power plant of special design, and a method for erecting and servicing such wind power plants in a manner minimizing the construction effort.

It is a particular object of the present invention to provide a tower having a first or lower natural frequency between the first (lower) and the second (higher) critical or exciting frequencies of the wind power system, and a second or higher natural frequency above the second (higher) critical frequency of the wind power system, the power house being mounted on the tower, and the tower being stayed or guyed.

A tower of this design has sufficient stability to safely carry the power house at modest wind loads and without support at the time of assembly, and in operation at maximum wind loads when supported, e.g., guyed. On the other hand, the tower has a minimum size which while being suitably related to the dimensions of the power house, affords ample scope for erecting the plant and greatly economizes building materials.

The present invention provides a particular advantage in that the diameter of the tower is less than the width of a power house of compact construction. In a further, related aspect of the present invention, the power house is largely assembled and equipped on the ground surrounding the tower and is then elevated to its place at the top of the tower.

This results in a method which affords the advantages of known tower erection methods in the construction business, which substantially economizes the design of wind power plants, and which additionally enables the power house to be readily lowered or elevated as required, as for servicing. For this purpose, the power house is disconnectably attached to the top of the tower.

The tower of the present invention may optionally be a construction of steel, reinforced concrete, or other materials such as plastic.

In a further aspect of the present invention, the staying or guying means of the tower are disconnectably attached to the tower. For this purpose, use may be made of wires equally spaced around the tower, one of their ends being attached to the tower and the other ends to anchor blocks embedded in the ground. For the ends attached to the tower, a ring surrounding the tower is preferably provided which holds these ends and is fixed to the tower when the plant has been erected. The ring facilitates disconnectable attachment of the wires and additionally enables a connection to be made with the power house, so that the ring then serves as a hoisting element for the wires when lowering or elevating the power house.

Stay wires provide another advantage in that when use is made of a large number of accordingly thinner wires, these may be wound for storage when the staying means are removed.

To elevate or lower the power house, use can be made of cables especially fitted for the particular hoisting job or else installed permanently in the wind power plant together with the hoisting means. The hoisting means are optionally fitted on the inside or the outside of the tower, depending on the particular application.

The power house is alternatively screwed up the tower in a threaded fashion, when the tower is optionally provided with a ledge extending in screw fashion. The power house is alternatively elevated or lowered using conventional construction aids such as hydraulic jacks used to move the power house step-by-step.

In a further aspect of the present invention the power house is provided with guide rollers, or sliding pieces, which bear on the tower and slide along it to provide safe guidance and keep the power house from oscillating.

The accompanying drawings illustrate various embodiments of the present invention, in which:

FIG. 1 schematically illustrates a wind power plant,

Figure 1:
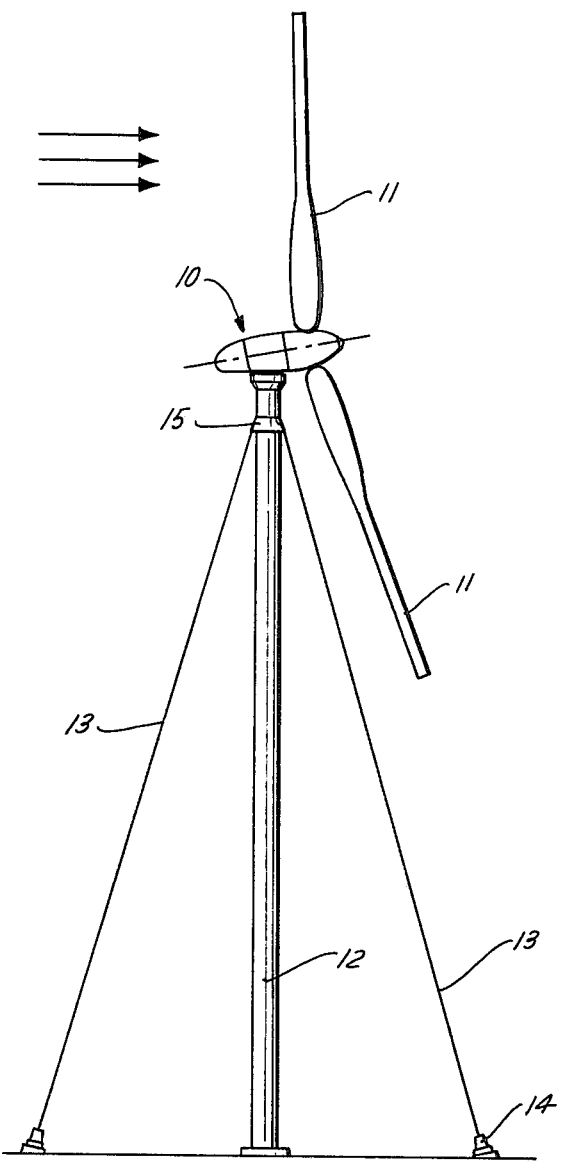

FIG. 1 illustrates a wind power plant consisting of a power house 10, carrying two wind sails or vanes 11, and being rotatably mounted on a tower 12. The air flow causes the vanes and associated machine members to rotate. As do rotors generally, this system likewise exhibits critical rotational speeds at which the rotating members are caused to vibrate and the vibrations are at least partially transferred to the tower via the power house.

Tower oscillations may also be engendered by factors resulting from the arrangement or configuration of the vanes, since the deflection of the airfoils and the attendant continuous shifts in center of gravity also induce vibrations. Where the vanes are arranged on the leeside of the tower, a further vibrations-inducing factor involves variations in thrust caused by the wind shadow of the tower.

In order to obtain a tower capable of withstanding the wind loads and the rotor forces, the conventional method was to erect a tower having a natural frequency above the critical frequencies of the rotor. A tower so designed, however, has a diameter exceeding the horizontal dimension of a power house sized to suit the machines it will carry. Owing to the great bulk involved, such a power house would have to be assembled away from the tower and be elevated and deposited on top of the tower by means of a second working tower.

Tower 12, however, is so designed that the second (higher) critical frequency of the wind power system is between the first or lower and the second or higher natural frequencies of the tower. For wind power systems of most recent development, this gives the straight, tubular tower 12 a diameter less than 4 meters at a wall thickness in the vicinity of 25 millimeters. This diameter is small enough to fit through a power house, which normally measures less than 6 meters in width, and to prevent undue interference with wind flow to the rotor on the leeside of the tower.

The amount of stability needed to safely withstand the considerable wind loads is achieved by means of guy wires 13 of steel, each of which is fastened at one end to an anchor block 14 in the ground, and is connected to a ring 15 at the other end. The ring 15 is disconnectably attached to the tower 12, and the wires 13 and ring 15 are lowered jointly when the power house is lowered from the tower 12 to permit servicing. Elevating and lowering of the power house are accomplished by a process described below. This situation is acceptable since the tower 12, as described above, has sufficient supporting ability to safely hold the power house 10 with the vanes 11 arrested and at moderate wind velocities even in the absence of guying provisions.

Figure 2:
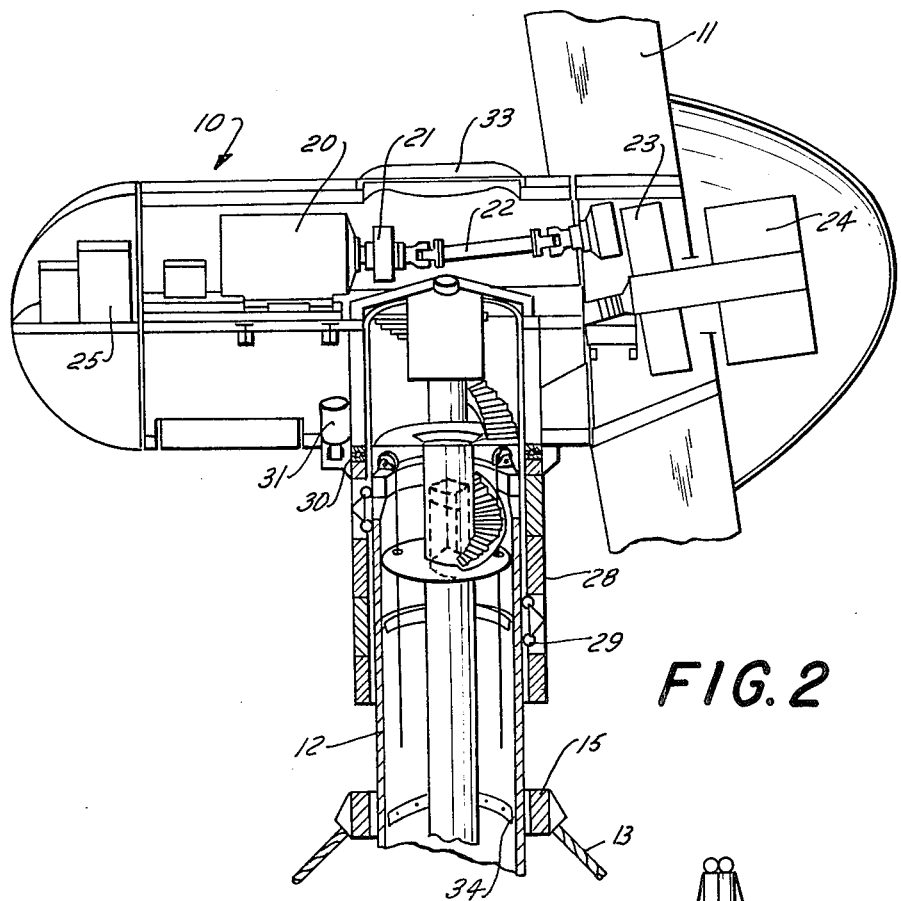
FIG. 2 is a sectional view, on a larger scale, illustrating a power house.

FIG. 2 illustrates the upper end of a wind power plant in cross-section. The machine housing 10 resting on the tower 12 may be a steel frame clad with metal sheet. The housing contains the requisite equipment, such as a generator 20 connected to a gearset 23 of the bladed rotor through a coupling 21 and a coupling shaft 22, control means 24, and auxiliary units 25. On its lower side, the power house 10 is connected to a guide sleeve 28 within which are guide rollers 29 bearing on the outer surface of the tower. The guide sleeve 28 is non-rotatably joined to the tower 12 whereas the power house is rotatably arranged for angular movement on a ring gear 30 with the aid of a geared motor 31.

The power house is designed for being elevated or lowered directly along the length of the tower. In the process, the components along the length of the power house, such as the coupling 21 and the coupling shaft 22, are displaced. A cover 33, over an opening on the top of the power house, is removed to permit the tower to pass through, and the arresting means 34 joining the guide sleeve 28 to the tower are disengaged. In the lowering process, the guide sleeve 28 contacts the ring 15 connected to the guy wires 13, thereby connecting the ring 15 to the sleeve 28 and disengaging the arresting means 34. In this manner the power house takes the ring 15 for the guy ropes with it on its way up or down the tower.

The power house 10 can be moved along the tower by making the guide rollers 29 friction rollers and driving them electrically to move the guide sleeve 28 and the power house 10 with it up or down. Power for this purpose comes, e.g., from the motor 31 through suitable couplings.

Figure 3:
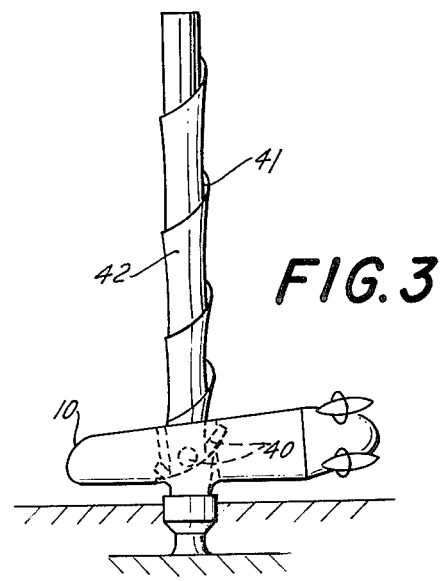
FIGS. 3 and 4 illustrate alternative embodiments for elevating and lowering the power house on the tower.
Figure 4:
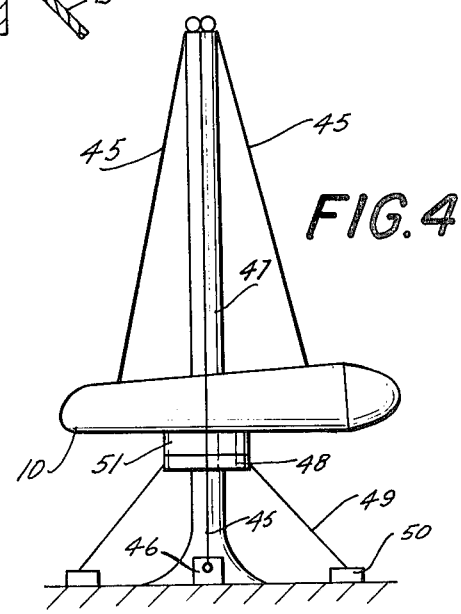

The invention also embraces other methods of erecting the wind power plant, such as are illustrated in FIGS. 3 to 4. With reference to FIG. 3, the power house 10 may be fitted with inclined friction rollers 40 bearing against a thread-like ledge 41 around the outer surface of tower 42. When the friction rollers 40 are driven, they elevate or lower the power house 10 in screw fashion, depending on the sense of rotation.

With reference to FIG. 4, the power house 10 may be moved by means of cables 45. A winch 46 for this purpose is installed on the ground adjacent to the tower 47. It may, if desired, be installed inside the tower 47. A ring 48 for guy wires 49 is connected to a guide sleeve 51 and is moved together with it. If use is made of a plurality of guy wires 49, they can be thin enough for winding up inside the anchor block 50 and for keeping them taut during the elevating process.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:
1. A wind power plant comprising
   (a) a wind power system including a power house having vanes rotatable by the wind,
   (b) a tower carrying said power house, said tower being so constructed that it has a lower natural frequency of vibration between the lower and higher critical frequencies of vibration of said power system, and said tower being so constructed that it has a higher natural frequency of vibration above the higher critical frequency of vibration of said power system, and
   (c) guy means supporting said tower.
2. A wind power plant as defined in claim 1 wherein said tower is of reinforced concrete construction.
3. A wind power plant as defined in claim 1 wherein said tower is hollow.
4. A wind power plant as defined in claim 1 including means for disconnectably attaching said guy means to said tower.
5. A wind power plant as defined in claim 4 wherein said guy means are flexible wires.
6. A wind power plant as defined in claim 5 wherein said means for attaching said guy wires to said tower includes a ring surrounding and disconnectably attached to said tower.
7. A wind power plant as defined in claim 1 wherein said power house is formed essentially of metal frame construction.
8. A wind power plant as defined in claim 1 wherein said power house is movable longitudinally with respect to said tower so that said power house may be elevated and lowered on said tower.

9. A wind power plant as defined in claim 1 wherein said tower is of steel construction.

10. A wind power plant as defined in claim 1 wherein said power house is formed essentially of plastic frame construction.

11. A method of building a wind power plant, comprising the steps of
 (a) erecting a tower,
 (b) assembling a power system including a power house having vanes rotatable by the wind, the assembly taking place on the ground and around the tower,
 (c) constructing the tower so that it has a lower natural frequency of vibration between the lower and higher critical frequencies of vibration of the power system, and constructing the tower so that it has a higher natural frequency of vibration above the higher critical frequency of the power system, and
 (d) elevating the power system along the tower.

* * * * *